United States Patent
Hsu

(10) Patent No.: US 9,220,367 B2
(45) Date of Patent: Dec. 29, 2015

(54) INTERMITTENT DRIVING DEVICE FOR A ROTATING GRILL RACK

(71) Applicant: Huang-Hsi Hsu, Taipei (TW)

(72) Inventor: Huang-Hsi Hsu, Taipei (TW)

( * ) Notice: Subject to any disclaimer, the term of this patent is extended or adjusted under 35 U.S.C. 154(b) by 511 days.

(21) Appl. No.: 13/668,354

(22) Filed: Nov. 5, 2012

(65) Prior Publication Data

US 2014/0026698 A1    Jan. 30, 2014

(30) Foreign Application Priority Data

Jul. 24, 2012   (TW) .............................. 101126587 A

(51) Int. Cl.
*A47J 37/07* (2006.01)
*F16H 3/34* (2006.01)
*F16H 27/08* (2006.01)
*A47J 37/04* (2006.01)

(52) U.S. Cl.
CPC .............. *A47J 37/041* (2013.01); *A47J 37/049* (2013.01); *F16H 3/34* (2013.01); *F16H 27/08* (2013.01); *Y10T 74/19358* (2015.01)

(58) Field of Classification Search
CPC ........... F16H 27/08; F16H 27/10; F16H 1/06; F16H 3/34
USPC .................................. 74/435, 322–324, 397
See application file for complete search history.

(56) References Cited

U.S. PATENT DOCUMENTS

| | | | | |
|---|---|---|---|---|
| 72,087 A | * | 12/1867 | Rowley | 74/399 |
| 833,848 A | * | 10/1906 | Rundlett | 74/397 |
| 1,331,760 A | * | 2/1920 | Harris | 74/84 R |
| 1,432,494 A | * | 10/1922 | Johannes | 74/435 |
| 1,718,961 A | * | 7/1929 | Humphrey | 99/421 HH |
| 1,748,390 A | * | 2/1930 | Fritz | 74/435 |
| 1,833,644 A | * | 11/1931 | Haegele | 74/435 |
| 2,323,415 A | * | 7/1943 | Overbury | 74/435 |
| 2,397,777 A | * | 4/1946 | Colman | 74/409 |
| 2,512,696 A | * | 6/1950 | Tappert | 74/435 |
| 2,810,299 A | * | 10/1957 | Partridge | 74/409 |
| 2,983,218 A | * | 5/1961 | Persinger et al. | 99/427 |
| 3,321,982 A | * | 5/1967 | Maunus et al. | 74/84 R |
| 3,704,890 A | * | 12/1972 | Zucker et al. | 273/143 R |
| 3,733,999 A | * | 5/1973 | Bernstein | 99/337 |
| 3,876,870 A | * | 4/1975 | Malavazos et al. | 235/101 |
| 3,972,290 A | * | 8/1976 | Czajkowski et al. | 102/238 |
| 3,989,372 A | * | 11/1976 | Davidge et al. | 399/34 |
| 4,057,959 A | * | 11/1977 | Insley et al. | 368/222 |
| 4,076,411 A | * | 2/1978 | Crayton et al. | 355/28 |
| 4,197,436 A | * | 4/1980 | Ishikawa et al. | 200/37 R |
| 4,442,763 A | * | 4/1984 | Beller | 99/427 |
| 4,562,771 A | * | 1/1986 | Williams | 99/397 |

(Continued)

*Primary Examiner* — David Angwin
*Assistant Examiner* — John J Norton
(74) *Attorney, Agent, or Firm* — Bacon & Thomas, PLLC

(57) ABSTRACT

The present invention is to provide an intermittent driving device, which includes a housing installed on an outer side of a grill burner and a control gear set fixedly provided in the housing. The control gear set includes an input gear, an intermittent gear and an output gear, wherein the input gear is rotated by a motor, the upper half of the intermittent gear is circumferentially and concavely provided with a rotation-stopping groove and meshes with the output gear, the lower half of the intermittent gear meshes with the input gear, and axle of the output gear has one end pivotally connected to axle of the input gear and has an opposite end securely connecting with a rotating grill rack outside the housing. Thus, the output gear can be rotated by the intermittent gear and then rotate the rotating grill rack intermittently above a heat source of the grill burner.

9 Claims, 6 Drawing Sheets

(56) References Cited

U.S. PATENT DOCUMENTS

| | | | |
|---|---|---|---|
| 5,660,101 A * | 8/1997 | Cirigliano | 99/395 |
| 5,669,290 A * | 9/1997 | Natsumi et al. | 99/421 H |
| 5,944,305 A * | 8/1999 | Takashima et al. | 271/127 |
| 6,312,095 B1 * | 11/2001 | Hiramatsu et al. | 347/37 |
| 2005/0103894 A1 * | 5/2005 | Takahashi et al. | 239/347 |

* cited by examiner

US 9,220,367 B2

INTERMITTENT DRIVING DEVICE FOR A ROTATING GRILL RACK

FIELD OF THE INVENTION

The present invention relates to a driving device for a rotating grill rack, more particularly to an intermittent driving device for rotating the rotating grill rack, and hence the food therein, intermittently or continuously above a heat source of the grill burner

BACKGROUND OF THE INVENTION

Recently, with the rapid development of economy, people are increasingly better off and, in addition to pursuing material enjoyment, pay more and more attention to recreational activities, one very popular example of which is the barbecue. Typically held outdoors, barbecues are a perfect activity in which family members or group members can take part and which therefore serves both recreational and social functions. Generally speaking, if one side of the food being barbecued is left facing the heat source for a long time, this side of the food is very likely to be overheated or even charred while the side facing away from the heat source is undercooked due to insufficient heating. In order to heat each part of the food evenly, the one in charge of grilling (hereinafter referred to as the user) has to turn the food on a regular basis.

As the manual side-turning operation in grilling requires the user to be attentive to the heated state of each piece of food being grilled and turn the different pieces one after another in a timely manner, the grilling process not only is laborious but also keeps the user from participating in other activities at the same time. In consideration of this, the inventor of the present application devised a "rotating grill rack". This rotating grill rack, schematically shown in FIG. 1 of the present application and generally indicated by the reference numeral 1, includes a rotating rod 11, a metal frame 12, and a supporting frame 13. The rotating rod 11 has one end connected to the output shaft of a motor and the other end fixedly provided on the metal frame 12 so as to position the metal frame 12 above a heat source. The metal frame 12 has two opposite ends each formed with two slide grooves 120, and all the slide grooves 120 are parallel to one another. The supporting frame 13 is configured for receiving food therein and has two opposite ends each provided with two insertion rods 130. The insertion rods 130 are respectively and movably engageable in the slide grooves 120. When the motor is in operation, the rotating rod 11 drives the metal frame 12 to rotate clockwise. Once the metal frame 12 has been rotated by more than 180 degrees, each insertion rod 130 slides along the corresponding slide groove 120, which is tilted, and falls to the opposite end of the corresponding slide groove 120. Thus, as shown in FIG. 1, each 180-degree rotation of the rotating grill rack 1 automatically turns upward the side of the supporting frame 13 that has been facing the heat source, allowing the other side of the supporting frame 13 to face the heat source by turns. Now that the rotating grill rack 1 can rotate automatically and continuously, the user is spared a lot of work.

However, the rotating grill rack 1, though capable of automatic rotation to heat food evenly, does not allow the heat of the heat source to be concentrated at a certain portion of the food for a long time. Therefore, when the rotating grill rack 1 is used to grill relatively chunky food (e.g., thick beef stake and turkey wings), the food tends to be cooked only on the outside but raw inside and hence requires more cooking time. The issue to be addressed by the present invention is to design a driving device which can control the rotating grill rack in such a way that, after being rotated for a predetermined amount of time, the rotating grill rack pauses (i.e., stops rotating) above the heat source for a while to heat a certain portion of the food longer.

BRIEF SUMMARY OF THE INVENTION

In view of the fact that the conventional grill racks do not provide heating in both a rotating mode and a stationary mode, the inventor of the present invention put years of practical experience into extensive research and experiment and finally succeeded in developing an intermittent driving device for a rotating grill rack. It is hoped that the present invention can eliminate the inconveniences of the conventional grill racks in use.

It is an object of the present invention to provide an intermittent driving device for a rotating grill rack, wherein the intermittent driving device includes a housing and a control gear set. The housing is installed on and fixed to an outer side of a grill burner. The control gear set is fixedly provided in the housing and includes an input gear, an intermittent gear, and an output gear. The axle of the input gear is fixed to one end of an output shaft such that the input gear can rotate synchronously with the output shaft. The intermittent gear is positioned adjacent to the input gear. The upper half of the intermittent gear is circumferentially and concavely provided with a rotation-stopping groove. The lower half of the intermittent gear, on the other hand, meshes with the input gear so as to be driven to rotate by the input gear. The axle of the output gear has one end either pivotally connected to the axle of the input gear or pivotally connected to the aforesaid end of the output shaft. The opposite end of the axle of the output gear is exposed from the housing and configured for securely connecting with a rotating grill rack. In addition, the output gear is positioned adjacent to the intermittent gear and can mesh with the upper half thereof so as to be driven to rotate by the intermittent gear. When the rotation-stopping groove of the intermittent gear is rotated to a position corresponding to the output gear, the output gear is temporarily released from the meshing relationship with the intermittent gear and stops rotating. Once the rotation-stopping groove is away from the output gear, the output gear meshes with the intermittent gear again and continues to rotate. Thus, the output gear can rotate the rotating grill rack, and hence the food therein, intermittently above a heat source of the grill burner.

Another object of the present invention is to provide the foregoing intermittent driving device, wherein the housing is formed with a positioning groove and the control gear set further includes a continuous gear. The positioning groove has a first end adjacent to the input gear. The continuous gear is provided with a control shaft which is movably engaged in and can be moved along the positioning groove. When the control shaft is positioned at the first end of the positioning groove, the continuous gear meshes with both the input gear and the output gear. This allows the rotating force of the control gear set to be transmitted to the rotating grill rack sequentially through the input gear, the continuous gear, and the output gear, causing the rotating grill rack to rotate continuously above the heat source. When the control shaft is moved to a second end of the positioning groove, the continuous gear is away from both the input gear and the output gear, and the rotating force of the control gear set can now be transmitted to the rotating grill rack sequentially through the input gear, the intermittent gear, and the output gear, causing the rotating grill rack to rotate intermittently above the heat source. Hence, by pushing the control shaft, the user can switch the rotating grill rack to an intermittent rotation mode or a continuous rotation mode to control the degree of cooking of the food as desired.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 1:
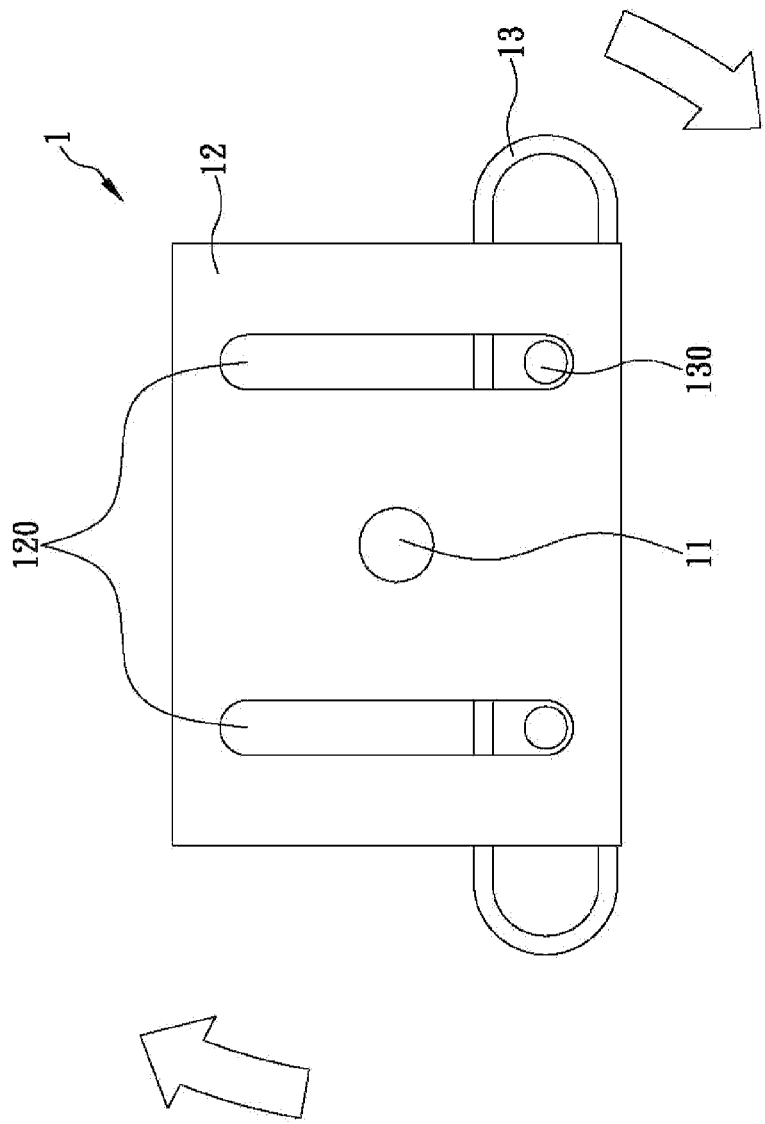
FIG. 1 is a schematic drawing of a conventional rotating grill rack.
Figure 2:
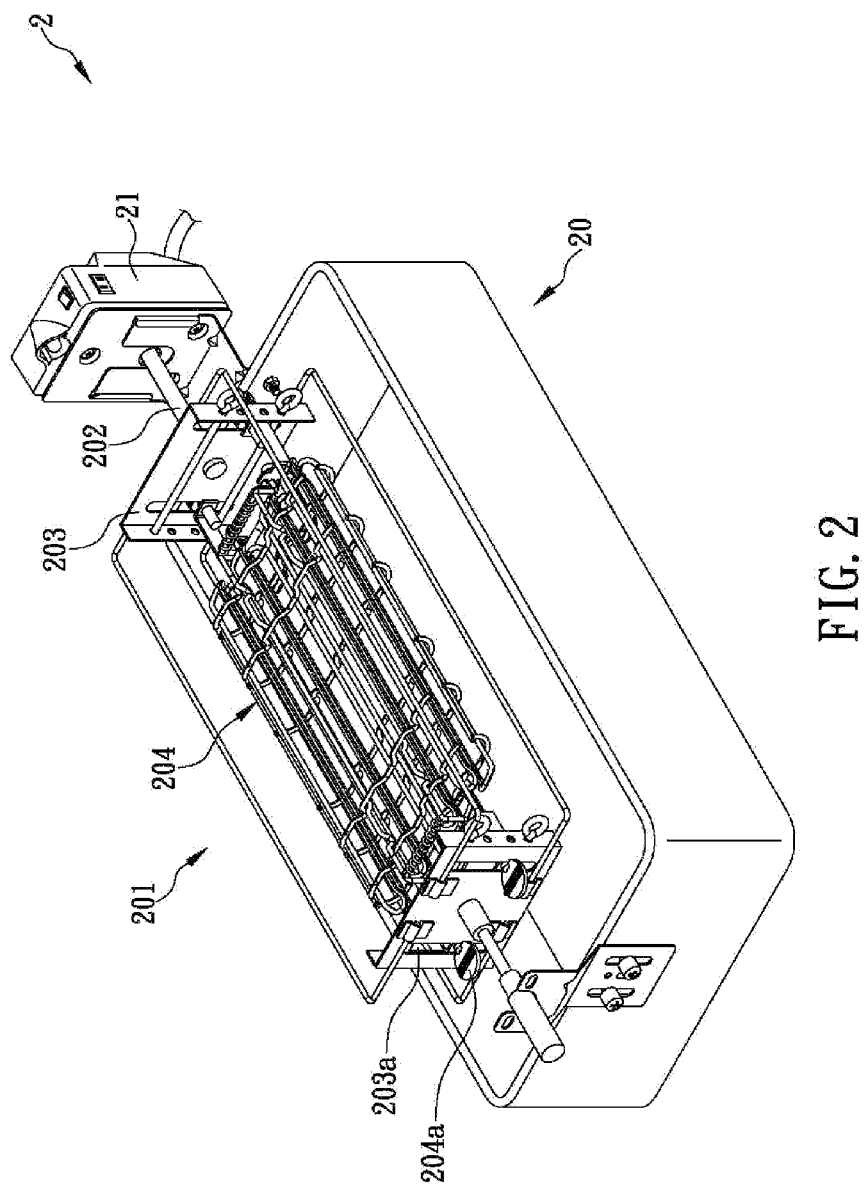
FIG. 2 is a perspective view of the first preferred embodiment of the intermittent driving device of the present invention.
Figure 3:
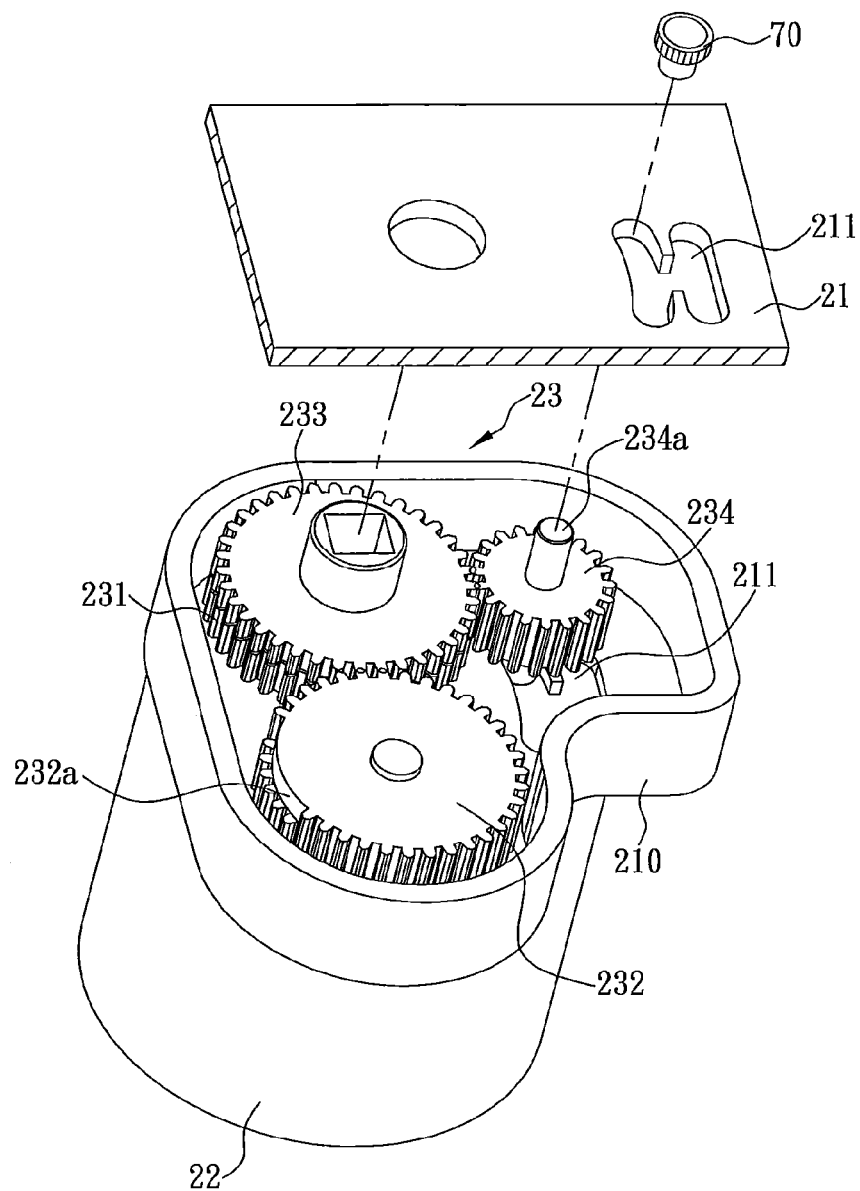
FIG. 3 is a perspective view of the first preferred embodiment of the control gear set in the present invention.

The present invention discloses an intermittent driving device for use with a rotating grill rack and applicable to a grill burner. Referring to FIGS. 2 and 3 for the first preferred embodiment of the present invention, the intermittent driving device 2 includes a housing 21, a motor 22, and a control gear set 23. The housing 21 is installed on and fixed to an outer side of a grill burner 20 and is configured for accommodating the motor 22 and the control gear set 23. The housing 21 is formed therein with a receiving chamber 210, and the receiving chamber 210 is provided therein with a positioning groove 211. In the first preferred embodiment of the present invention, the control gear set 23 is fixedly provided in the receiving chamber 210, and an output shaft of the motor 22 passes through the wall of and extends into the receiving chamber 210 to connect with the control gear set 23. In other preferred embodiments of the present invention, however, the control gear set 23 may be directly fixedly provided on an inner wall surface of the housing 21, and the motor 22 may drive the output shaft and the control gear set 23 indirectly, e.g., through a reduction gear set.

Refer again to FIGS. 2 and 3, in which FIG. 3 is a perspective view of the first preferred embodiment of the control gear set 23. The control gear set 23 includes an input gear 231, an intermittent gear 232, an output gear 233, and a continuous gear 234. The input gear 231 has an axle pivotally connected to the output shaft of the motor 22 so that, when the motor 22 is powered on, the input gear 231 rotates synchronously with the motor 22. The intermittent gear 232 is positioned in the receiving chamber 210 at a position adjacent to the input gear 231. The upper half of the intermittent gear 232 is circumferentially and concavely provided with a rotation-stopping groove 232a. The lower half of the intermittent gear 232 meshes with and can be driven to rotate by the input gear 231. The output gear 233 has an axle whose one end is pivotally connected to one end of the output shaft; thus, the output gear 233 is located above the input gear 231 but cannot be driven to rotate by the input gear 231. The other end of the axle of the output gear 233 is exposed from the housing 21 and is configured for connection with a rotating grill rack 201. The output gear 233 is fixedly provided at a position adjacent to the intermittent gear 232 so as to mesh with the upper half of the intermittent gear 232. When the output gear 233 is driven to rotate by the intermittent gear 232, the rotating grill rack 201 is driven to rotate by and along with the output gear 233, thus allowing the food in the rotating grill rack 201 to be heated and cooked evenly above a heat source.

Referring again to FIGS. 2 and 3, once the motor 22 is in operation, the rotating force of the control gear set 23 is transmitted to the rotating grill rack 201 through the input gear 231, the intermittent gear 232, and the output gear 233, in that order. When the rotation-stopping groove 232a is rotated to a position corresponding to the output gear 233, the output gear 233 is temporarily released from the meshing relationship with the intermittent gear 232 and stops rotating. As soon as the rotation-stopping groove 232a is rotated away from the output gear 233, the teeth of the output gear 233 mesh with the teeth of the intermittent gear 232 again, and the output gear 233 resumes rotation. Thus, the rotating grill rack 201 is intermittently rotated above the heat source in the grill burner 20, allowing the food in the rotating grill rack 201 not only to be heated evenly but also to stay temporarily above the heat source after rotation for some time. The temporary stay above the heat source is intended to heat a specific portion of the food more intensively and ensure that the heat of the heat source will penetrate the food.

In the first preferred embodiment of the present invention as shown in FIGS. 2 and 3, the rotating grill rack 201 includes a rotating rod 202, a metal frame 203, and a supporting frame 204. The rotating rod 202 has one end engaged with the axle of the output gear 233 and the other end fixedly provided on the metal frame 203. The metal frame 203 has two sides each provided with two slide grooves 203a. The supporting frame 204 has two ends each provided with two insertion rods 204a. The insertion rods 204a can be positioned in the slide grooves 203a respectively. In the course where the rotating grill rack 201 is driven to rotate by the output gear 233, the supporting frame 204 can move along the slide grooves 203a such that the heated side of the supporting frame 204 is changed by turns. It can be known from FIG. 3 that, when the control gear set 23 is in intermittent rotation and the rotation-stopping groove 232a is rotated to a position corresponding to the output gear 233, the rotating force of the control gear set 23 cannot be transmitted to the output gear 233 through the intermittent gear 232; as a result, the output gear 233 is in a free state in which the rotating grill rack 201 will, driven by its own weight, turn to a horizontal position above the heat source. Once the rotation-stopping groove 232a is away from the output gear 233, the rotating grill rack 201 is driven to rotate again by the motor 22. More specifically, the control gear set 23 is so configured that, regardless of the angle at which the rotating grill rack 201 lies upon actuation, the rotating grill rack 201 can automatically resume the horizontal position, stop rotating, and maintain this horizontal position, thanks to the rotation-stopping groove 232a, thus allowing the heat source to heat the food evenly.

Figure 4A:
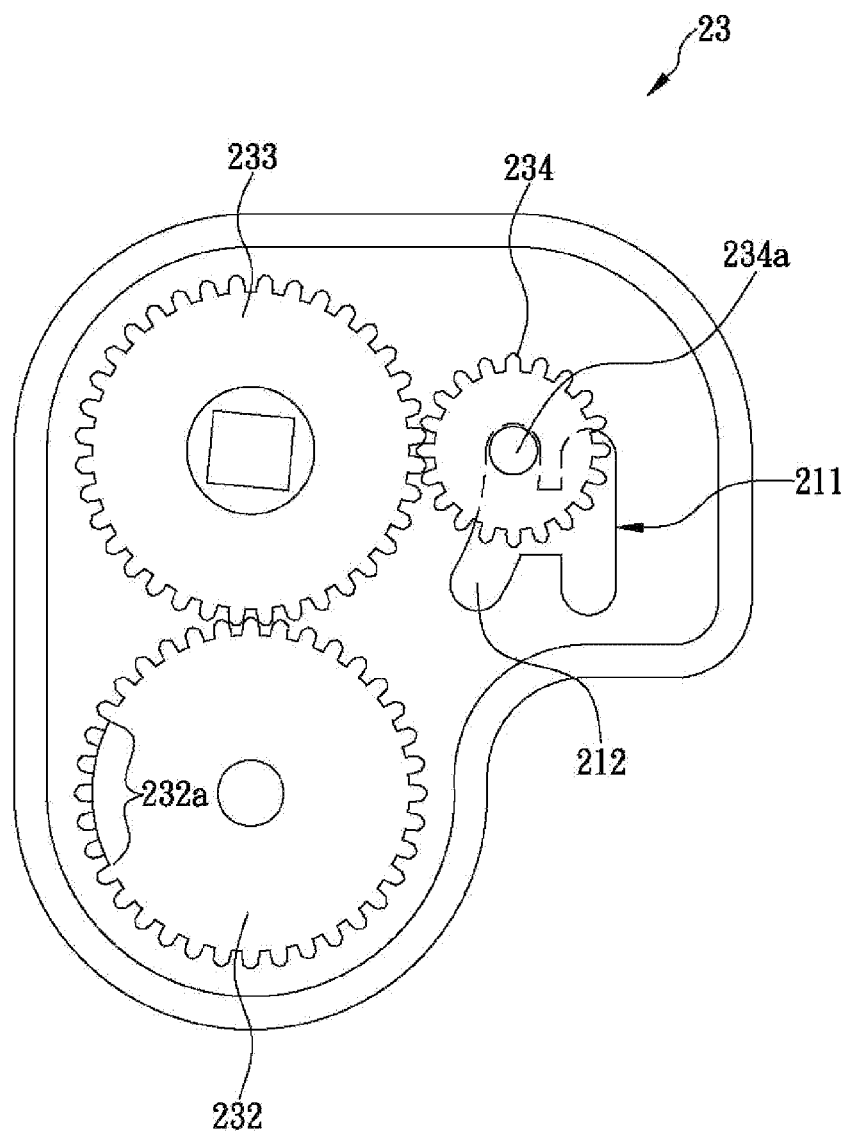
FIG. 4A schematically shows the first preferred embodiment of the control gear set in the present invention.
Figure 4B:
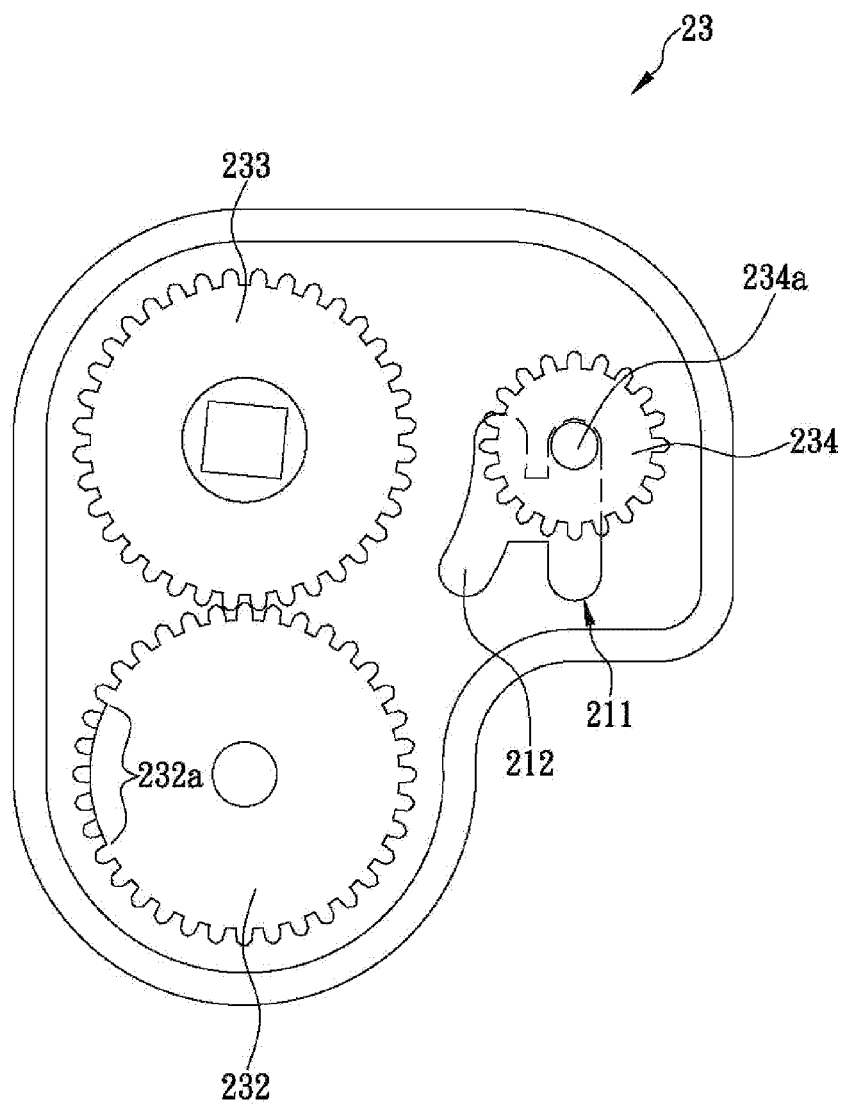
FIG. 4B is another schematic drawing of the first preferred embodiment of the control gear set in the present invention.

Referring to FIGS. 3, 4A, and 4B, the positioning groove 211 has a first end adjacent to the input gear 231, and the axle of the continuous gear 234 is provided with a control shaft 234a. The control shaft 234a has one end engaged in and movable along the positioning groove 211. When the control shaft 234a is positioned at the first end of the positioning groove 211 (as shown in FIG. 4A), the continuous gear 234 meshes with both the input gear 231 and the output gear 233; hence, by means of the continuous gear 234, the input gear 231 can continuously drive the output gear 233 to rotate. When the aforesaid end of the control shaft 234a is moved to a second end of the positioning groove 211 (as shown in FIG. 4B), the continuous gear 234 is moved away from both the input gear 231 and the output gear 233 such that the input gear 231 can again drive the output gear 233 into intermittent rotation through the intermittent gear 232. Thus, by pushing the control shaft 234a, operation of the output gear 233 can be switched to the intermittent rotation mode or the continuous rotation mode.

Referring again to FIGS. 2 to 4A and 4B, the first end of the positioning groove 211 in this embodiment further has an outwardly extending engaging groove 212. The engaging groove 212 has an arcuate configuration and corresponds to the circumferential direction of the input gear 231. When the input gear 231 is rotated in a certain direction (e.g., counter-clockwise), the control shaft 234a is pressed against one end of the engaging groove 212 (as shown in FIG. 4A). When the input gear 231 is rotated in the opposite direction (e.g., clockwise), the control shaft 234a is pressed against the other end of the engaging groove 212. Therefore, whether the input gear 231 is rotated clockwise or counterclockwise, the control shaft 234a will always be securely pressed against an inner wall surface of the first end of the positioning groove 211 and will not be pushed to the second end of the positioning groove 211 by the rotating force of the input gear 231. In addition, although the positioning groove 211 is shown in FIGS. 4A and 4B as having a generally H-shaped configuration, the configuration of the positioning groove 211 is not limited thereto, provided that the positioning groove 211 allows the continuous gear 234 to move to a position adjacent to both the input gear 231 and the output gear 233 and transmit the rotating force of the input gear 231 to the output gear 233, or allows the continuous gear 234 to move away from both the input gear 231 and the output gear 233 such that the input gear 231 can drive the output gear 233 only through the intermittent gear 232.

Referring to FIGS. 2 and 3, in other preferred embodiments of the present invention, the aforesaid end of the control shaft 234a may pass through the bottom of the positioning groove 211 and extends out of the housing 21 so as to be pushed by the user from outside the housing 21. Alternatively, the intermittent driving device 2 may be additionally provided with a pushing member 70, wherein the pushing member 70 is located outside the housing 21 and connected to the aforesaid end of the control shaft 234a. Thus, when pushed from outside the housing 21, the pushing member 70 can drive the control shaft 234a to move along the positioning groove 211.

It should be pointed out that, although the output gear 233 in the previous embodiment is pivotally connected to the output shaft of the motor 22, the element to which the output gear 233 is connected is not limited thereto. The output gear 233 may also be pivotally connected to the axle of the input gear 231, or the output gear 233 may be directly pivotally connected to an inner wall surface of the housing 21 at a position corresponding to the input gear 231. Moreover, while the positioning groove 211 in FIGS. 2 to 4B is directly formed in the receiving chamber 210, it is also feasible to form the positioning groove 211 directly on an outer surface of the housing 21 so that the user can push the control shaft 234a with ease.

Figure 5A:
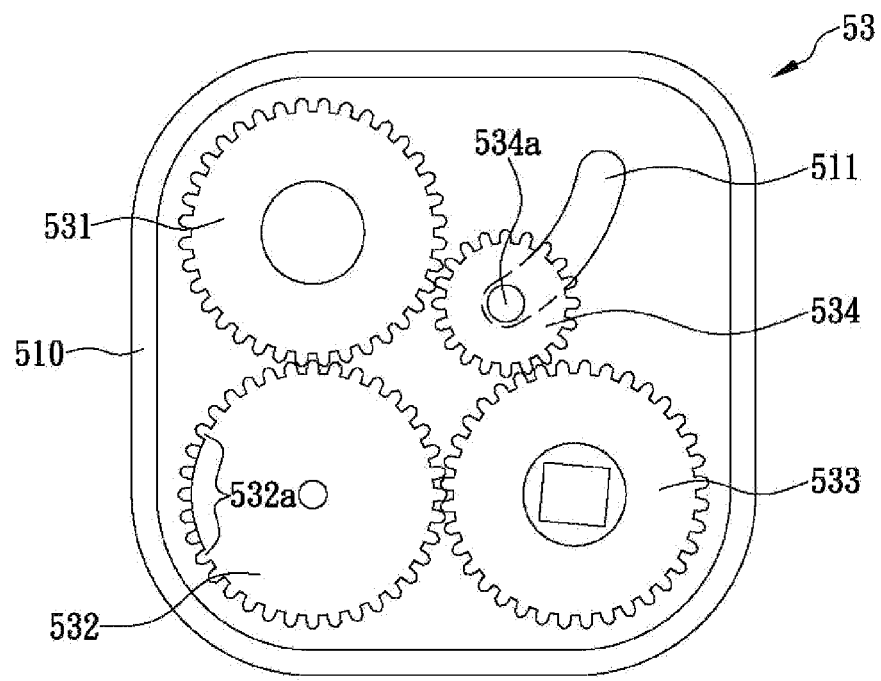
FIG. 5A schematically shows the second preferred embodiment of the control gear set in the present invention.
Figure 5B:
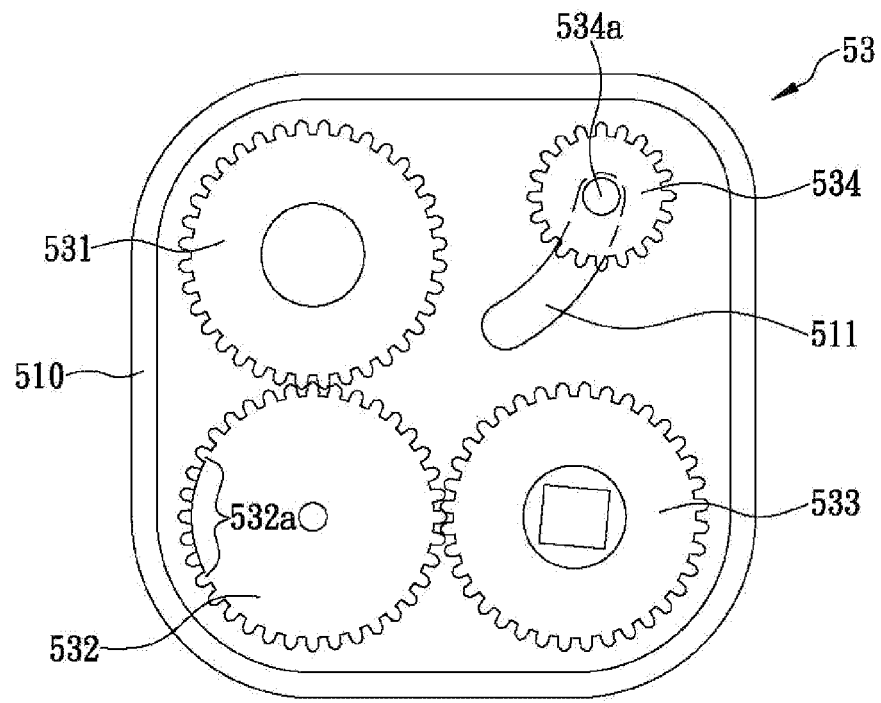
FIG. 5B is another schematic drawing of the second preferred embodiment of the control gear set in the present invention.

Referring to FIGS. 5A and 5B for the second preferred embodiment of the present invention, the intermittent driving device in this embodiment also includes a housing and a control gear set 53, wherein the housing has the same structural features as its counterpart in the previous embodiment and therefore will not be described repeatedly. The control gear set 53 also includes an input gear 531, an intermittent gear 532, an output gear 533, and a continuous gear 534. The input gear 531 is fixedly provided in a receiving chamber 510 of the housing and is adjacent to a positioning groove 511. The axle of the input gear 531 is pivotally connected to and can be driven to rotate by the output shaft of a motor. The intermittent gear 532 is provided in the receiving chamber 510 at a position adjacent to the input gear 531. The upper half of the intermittent gear 532 is circumferentially and concavely provided with a rotation-stopping groove 532a while the lower half of the intermittent gear 532 meshes with the input gear 531. The axle of the output gear 533 is pivotally provided in the receiving chamber 510 and adjacent to the intermittent gear 532 (or is directly pivotally provided on an inner wall surface of the housing) such that the teeth of the output gear 533 can mesh with the teeth on the upper half of the intermittent gear 532.

The continuous gear 534 is provided with a control shaft 534a. The control shaft 534a is positioned in and can move along the positioning groove 511. When the control shaft 534a is positioned at a first end of the positioning groove 511, the continuous gear 534 meshes with both the input gear 531 and the output gear 533 such that, by means of the continuous gear 534, the input gear 531 can continuously drive the output gear 533 into rotation. When the end of the control shaft 534a that is movably engaged in the positioning groove 511 is moved to a second end of the positioning groove 511, the continuous gear 534 is moved away from the input gear 531 and the output gear 533, thus allowing the input gear 531 to once again drive the output gear 533 into intermittent rotation by means of the intermittent gear 532. Hence, although the output gear 533 is not coaxially provided on the input gear 531, the control gear set 53 is equally capable of the effects achievable by the previous embodiment.

While the invention herein disclosed has been described by means of specific embodiments, numerous modifications and variations could be made thereto by those skilled in the art without departing from the scope of the invention set forth in the claims.

What is claimed is:

1. An intermittent driving device for a rotating grill rack, comprising:
 a housing installed on and fixed to an outer side of a grill burner and formed with a positioning groove;
 a motor accommodated in the housing and having an output shaft; and
 a control gear set fixedly provided in the housing and comprising:
 an input gear having an axle fixed to an end of the output shaft so as to rotate synchronously with the output shaft;
 an intermittent gear being positioned adjacent to the input gear, having an upper half circumferentially and concavely provided with a rotation-stopping groove and a lower half meshing with the input gear so as to be driven to rotate by the input gear;
 an output gear having an axle whose first end is pivotally connected in the housing and whose second end is exposed from the housing and configured for securely connecting with a rotating grill rack, the output gear being positioned adjacent to the intermittent gear so as to mesh with the upper half of the intermittent gear and be driven to rotate by the intermittent gear, wherein when the rotation-stopping groove of the intermittent gear is rotated to a position corresponding to the output gear, the output gear is temporarily released from meshing with the intermittent gear and stops rotating, and when the rotation-stopping groove is away from the output gear, the output gear meshes with the intermittent gear again and resumes rotation; and a continuous gear being provided with a control shaft, the control shaft being movably engaged in and movable along the positioning groove, wherein the control shaft has an end passing through the positioning groove and extending out of the housing such that, when the end of the control shaft is pushed from outside the housing, the control shaft is moved along the positioning groove; wherein when the control shaft is positioned at a first end of the positioning groove, the continuous gear meshes with both the input gear and the output gear so as for the rotating grill rack to rotate continuously above the grill burner, and when the control shaft is moved to a second end of the positioning groove, the continuous gear is away from the input gear and the output gear so as for the rotating grill rack to rotate intermittently above the grill burner, thus allowing a heat source in the grill burner to heat food on the rotating grill rack evenly.

2. The intermittent driving device of claim 1, wherein the first end of the axle of the output gear is pivotally connected to the axle of the input gear.

3. The intermittent driving device of claim 1, wherein the first end of the axle of the output gear is pivotally connected to the end of the output shaft.

4. The intermittent driving device of claim 1, wherein the housing is further formed therein with a receiving chamber in which the control gear set is received, and the output shaft extends into the receiving chamber to connect with the input gear.

5. The intermittent driving device of claim 2, wherein the housing is further formed therein with a receiving chamber in which the control gear set is received, and the output shaft extends into the receiving chamber to connect with the input gear.

6. The intermittent driving device of claim 3, wherein the housing is further formed therein with a receiving chamber in which the control gear set is received, and the output shaft extends into the receiving chamber to connect with the input gear.

7. The intermittent driving device of claim 1, further comprising a pushing member, the pushing member being provided outside the housing and connected to the control shaft such that, when pushed from outside the housing, the pushing member drives the control shaft to move along the positioning groove.

8. The intermittent driving device of claim 2, further comprising a pushing member, the pushing member being provided outside the housing and connected to the control shaft such that, when pushed from outside the housing, the pushing member drives the control shaft to move along the positioning groove.

9. The intermittent driving device of claim 3, further comprising a pushing member, the pushing member being provided outside the housing and connected to the control shaft such that, when pushed from outside the housing, the pushing member drives the control shaft to move along the positioning groove.

* * * * *